Sept. 19, 1939. J. F. READ 2,173,767
AIRCRAFT CONTROL
Filed March 24, 1937
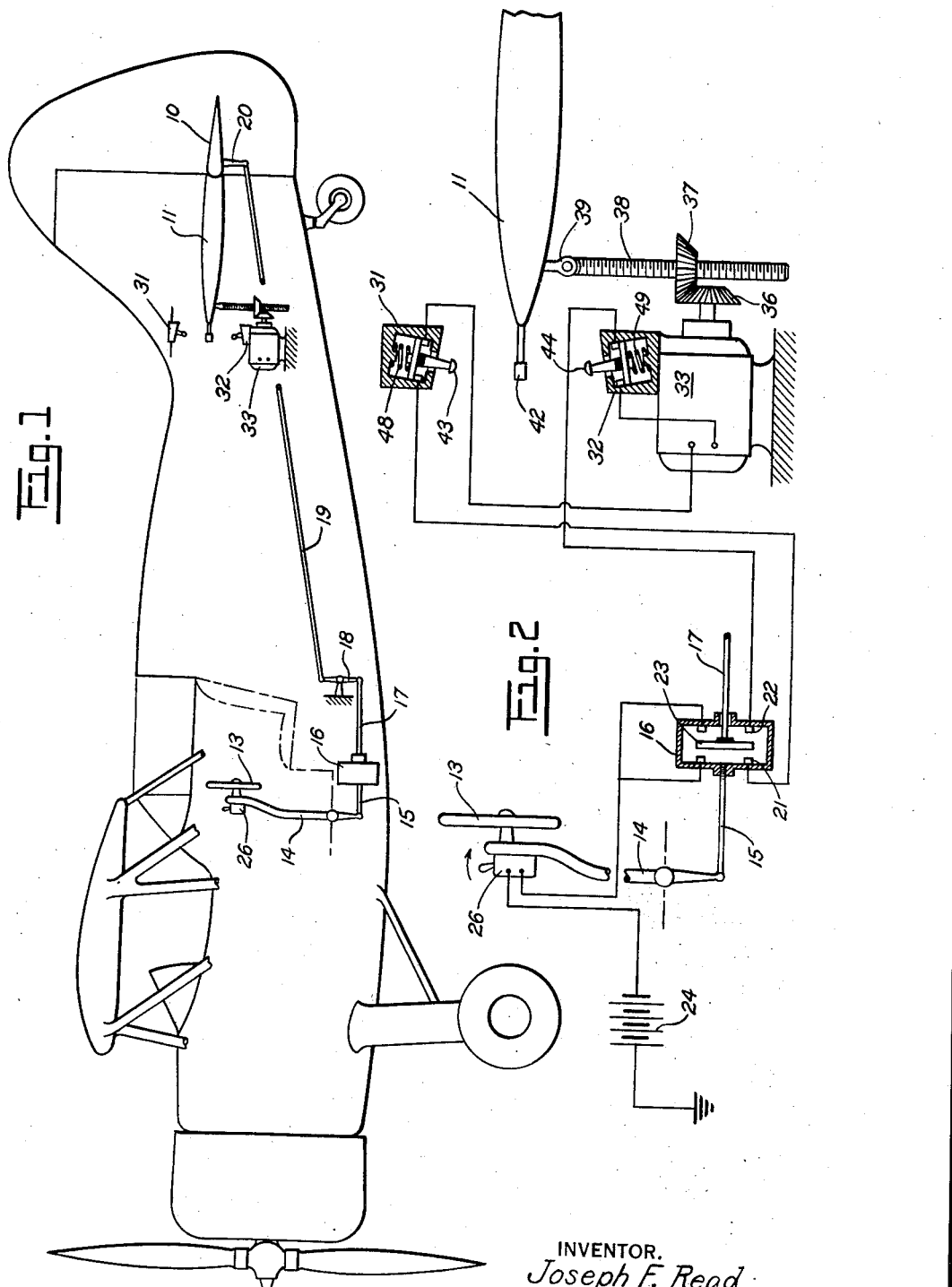
INVENTOR.
Joseph F. Read
BY Martin J. Finnegan
ATTORNEY Patented Sept. 19, 1939

2,173,767

UNITED STATES PATENT OFFICE 2,173,767

AIRCRAFT CONTROL

Joseph F. Read, Davenport, Iowa, assignor to Eclipse Aviation Corporation, East Orange, N. J., a corporation of New Jersey Application March 24, 1937, Serial No. 132,850

4 Claims. (Cl. 244—75)

This invention relates to aircraft control, and particularly to the control of the flight of an aircraft through the agency of a shiftable stabilizing surface such as the horizontal stabilizer or "tailplane" on which the craft's horizontal rudder ("elevator") is hingedly supported.

In the early development of the art it was customary to fix the horizontal stabilizer rigidly to the longerons of the fuselage, so that the surface thereof would remain in a fixed plane in relation to the plane of the longitudinal axis of the craft. This plane was either exactly horizontal, that is, parallel to the ground, or departed from such parallelism by a very slight amount—often no more than a fraction of a single degree on the arc of a circle. Such an arrangement aided in the maintenance of good flying qualities—so long as the craft proceeded in a straight, level course, at constant speed, and with no change in its center of gravity. When, however, it becomes necessary for the operator to change speed, as in landing or taking off, or when the center of gravity is moved back or forward, as by an increase or decrease in load, the fixed, unchangeable setting of the stabilizer is a handicap, in that the changed conditions really call for a new angle of incidence for the stabilizer surface—either above or below the horizontal, depending upon whether the longitudinal axis of the craft has tended to tilt up or down. Thus, to correct for a forward shifting of the load (as in descending), it is desirable to have the stabilizer surface tilted upwardly to give greatest effectiveness to the horizontal rudder, or "elevator"; while to correct for a rearward shifting (as in climbing) the reverse is true.

It is accordingly an object of the present invention to provide automatically operating stabilizer shifting means, whereby a movement of the elevator controls will automatically cause a shifting of the stabilizer by an amount, and in a direction, bearing a predetermined relationship to the amount and direction of shift of the elevator.

Another object is to provide means for controlling both the duration and the extent of the stabilizer shifting action, first, in accordance with the duration of the elevator shifting action, and secondly, in accordance with the extent of stabilizer movement, whereby the stabilizer actuating means will cease to function beyond predetermined positions of the stabilizer.

Another object is to provide a novel stabilizer actuating mechanism, together with novel means for producing and controlling energization thereof.

These and other objects of the invention will become apparent from inspection of the following specification when read with reference to the accompanying drawing wherein is illustrated the preferred embodiment of the invention. It is to be expressly understood, however, that the drawing is for the purpose of illustration only, and is not designed as a definition of the limits of the invention, reference being had to the appended claims for this purpose.

Referring to the drawing:

Fig. 1 is a view in elevation of an airplane with the present invention diagrammatically applied thereto; and Fig. 2 is a similar diagrammatic view of the invention, with parts in section.

Reference character 10 designates an "elevator", or horizontal rudder, pivotally connected to the stabilizer 11 of the craft, and operable up or down by movement of the control wheel 13 which connects with the elevator through links 14 to 20, inclusive—links 14 and 18 being in the form of levers mounted to rock about fixed supports on the fuselage, and link 16 being in the form of a floating switch housing containing two sets of contacts (21, 22) alternately engageable with a current conducting bridging member 23 insulatedly mounted on the end of link 17 which projects from the housing, but without being fixed thereto. Upper contacts 21, 22 lead from the source 24 (by way of a master control switch 26, normally closed) while lower contacts 21, 22 lead to separate limit switches 31, 32, controlling the direction of rotation of the motor 33. This motor drives bevel gears 36, 37, the latter being internally threaded to co-act with corresponding threaded screw 38, the upper end of which pivotally connects with the stabilizer fitting 39 to move the stabilizer up or down, depending upon the direction of rotation of gear 37 and hence the direction of advance of screw 38. Movement continues until one or another of switches 26, 21, or 22 is opened (as by a restoration of control wheel 13 to the neutral position) or until projection 42 of the stabilizer engages plunger 43 or 44, as the case may be, and presses said plunger sufficiently firmly to interrupt the circuit through the current conducting plunger head (insulated from the projecting portion thereof, in each case, as indicated). Springs 48, 49, normally hold the plunger heads in circuit closing position.

What is claimed is:

1. In an aeroplane having a shiftable stabilizing surface, an "elevator" hinged horizontally to said stabilizing surface, means for swinging said elevator about said horizontal hinge, and means responsive to operation of said last-named means to swing said stabilizing surface about said horizontal hinge, said last-named means including an electric motor, an energizing circuit for said motor, means for closing said circuit, and means movable with said stabilizing surface to open said energizing circuit.

2. In an aeroplane having a shiftable stabilizing surface, an "elevator" hinged horizontally to said stabilizing surface, means including a floating switch for swinging said elevator about said horizontal hinge, and means responsive to operation of said last-named means to swing said stabilizing surface about said horizontal hinge, said last-named means including an electric motor, an energizing circuit for said motor, means for actuating said floating switch to close said circuit, and means movable with said stabilizing surface to open said energizing circuit.

3. In an aeroplane having a shiftable stabilizing surface, an "elevator" hinged horizontally to said stabilizing surface, means for swinging said elevator about said horizontal hinge, and means responsive to operation of said last-named means to swing said stabilizing surface about said horizontal hinge, said last-named means including a motor, energizing means for said motor, and means movable with said stabilizing surface to control operation of said energizing means.

4. In an aeroplane having a shiftable stabilizing surface, an "elevator" hinged horizontally of said aeroplane, means for swinging said elevator, and means responsive to operation of said last-named means to swing said stabilizing surface, said last-named means including a motor, energizing means for said motor, and means movable with said stabilizing surface to control operation of said energizing means.

JOSEPH F. READ.